United States Patent [19]

Okino et al.

[11] Patent Number: 4,944,199
[45] Date of Patent: Jul. 31, 1990

[54] CONTROL APPARATUS FOR A VEHICLE ENGINE EQUIPPED WITH AN AUTOMATIC TRANSMISSION

[75] Inventors: Yoshinori Okino; Naoyuki Noguchi; Tatsuya Kita; Takuro Shigemura, all of Hiroshima, Japan

[73] Assignee: Mazda Motor Corp., Hiroshima, Japan

[21] Appl. No.: 225,790

[22] Filed: Jul. 29, 1988

[30] Foreign Application Priority Data

Jul. 31, 1987 [JP] Japan .................. 62-193118

[51] Int. Cl.⁵ .............................................. B60K 41/02
[52] U.S. Cl. ...................................... 74/858; 74/866; 123/325
[58] Field of Search ............... 74/858, 872, 843, 866; 192/0.082, 103 F; 123/320, 325, 326

[56] References Cited

U.S. PATENT DOCUMENTS

| 4,008,696 | 2/1977 | Hisatomi | 123/326 |
|---|---|---|---|
| 4,242,991 | 1/1981 | Scherenberg et al. | 123/326 |
| 4,422,353 | 12/1983 | Suga et al. | 74/858 |
| 4,434,759 | 3/1984 | Iezuka et al. | 123/325 |
| 4,452,212 | 6/1984 | Takase | 123/326 X |
| 4,484,497 | 11/1984 | Hibino | 74/872 X |
| 4,527,521 | 7/1985 | Hasegawa et al. | 123/326 |
| 4,694,796 | 9/1987 | Mori | 123/325 |
| 4,697,559 | 10/1987 | Suzuki et al. | 123/325 |
| 4,714,064 | 12/1987 | Imazu | 123/325 X |
| 4,721,082 | 1/1988 | Hibino et al. | 123/339 |
| 4,790,275 | 12/1988 | Iida | 123/325 |
| 4,825,366 | 4/1989 | Yamomoto et al. | 74/866 X |

FOREIGN PATENT DOCUMENTS

| 75256 | 3/1983 | European Pat. Off. | 74/645 |
|---|---|---|---|
| 61-184269 | 8/1986 | Japan . | |

*Primary Examiner*—Dwight Diehl
*Assistant Examiner*—Chris Campbell
*Attorney, Agent, or Firm*—Fleit, Jacobson, Cohn, Price, Holman & Stern

[57] ABSTRACT

A controller controls an engine in cooperation with an automatic transmission which is automatically locked when an operating speed of the engine is higher than a previously established transmission lockup speed. The controller includes an engine power increasing device when an operating engine speed becomes lower than the transmission lockup release speed. The transmission lockup release speed is corrected according to deceleration rates.

4 Claims, 8 Drawing Sheets

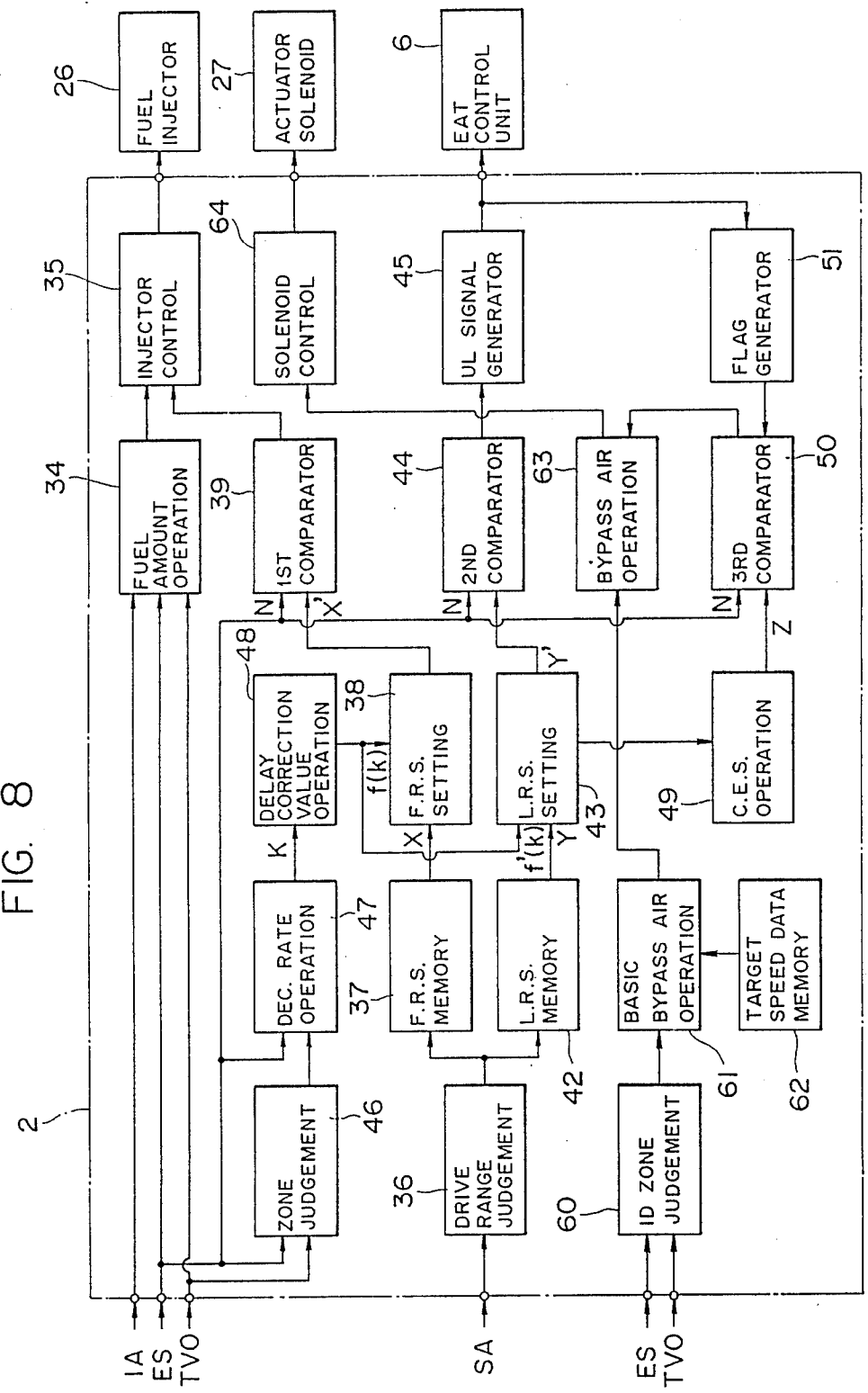

CONTROL APPARATUS FOR A VEHICLE ENGINE EQUIPPED WITH AN AUTOMATIC TRANSMISSION

FIELD OF THE INVENTION

The present invention relates to a control apparatus for a vehicle equipped with an automatic transmission which is adapted to lockup itself when the vehicle slows down and, more particularly, to a control apparatus for controlling a vehicle engine in cooperation with an automatic transmission, which can not only prevent the vehicle engine from stalling due to a delayed control of the vehicle engine upon rapid deceleration but increasingly make use of the braking power of the vehicle engine upon deceleration.

BACKGROUND OF THE INVENTION

Normal converters of automatic transmissions allow some slippage, even at cruising speeds. This is due to the fact that the only connection between pump and turbine of the converter is the transmission fluid.

To prevent this slipping action, and thus improve fuel economy, a number of converters are equipped with a lockup feature. When a lockup unit is actuated, the pump (impeller) and turbine are mechanically locked together. Some vehicle engines equipped with such converters are so designed as to lock the pump and turbine together so as to use efficiently the braking power of an engine when the vehicle engine is decelerated. In such a vehicle engine, the converter of an automatic transmission is unlocked to decrease engine loading so as not only to prevent engine stall but also reduce shocks when the speed of vehicle is decreased.

Meanwhile, for better fuel economy, there are known fuel injection systems controlled to temporarily shut off the injection of fuel when the vehicle slows down. Such a fuel injection shut-off control is terminated when the speed of vehicle engine reaches a predetermined or preselected or specified speed (which is called a fuel injection recovery speed in this specification) for the purpose of the prevention of engine stall.

In the vehicle engine which has such a fuel injection cut-off feature and is in cooperation with an automatic transmission with a torque converter through which the vehicle engine and a propeller shaft are cooperated even when the vehicle slows down, it becomes hard to make use of the braking power of engine and, furthermore, to make the injection of fuel shut off for a long period of time in comparison with vehicle engines equipped with manual transmissions because the vehicle engine rapidly slows down. This leads to a bad fuel economy.

In an attempt at overcoming such problems with such vehicle engines equipped with automatic transmissions in which a fuel cut control is carried out when the vehicle engine is decelerated, as is disclosed in, for example, Japanese Patent Unexamined Publication No. 61-184,269 entitled "Lockup control device for an automatic transmission used on a vehicle equipped with an engine with fuel cut control", laid open on Aug. 16, 1986, an automatic transmission is locked up when the vehicle engine operates within a speed range in which a fuel cut control is carried out while the vehicle engine is decelerated, to thereby maintain the vehicle engine and a propeller shaft in cooperation with each other so as not only to make use efficiently of the braking power of the vehicle engine but to maintain the vehicle engine operating at a speed above a fuel cut speed at which the injection of fuel is suspended in order to save fuel. Any such vehicle engine is adapted to unlock the automatic transmission immediately before the recovery of fuel injection in order to avoid shocks possibly generating due to a rapid development of engine power as a result of the recovery of fuel injection.

In practice, there is a delay of control from the provision of a lockup release signal till the automatic transmission is actually unlocked. Such a delay of lockup release control is caused due to the resistance of pressurized oil developed upon operating a control valve in a hydraulic power circuit for lockup means, such as a lockup clutch, of the automatic transmission. For compensating the delay of lockup release control, a speed of vehicle engine at which the automatic transmission is unlocked (which is called a lockup release speed in this specification) is usually set higher than a fuel injection recovery speed.

A serious problem in association with the vehicle engine is that, when a rapid deceleration takes place, the automatic transmission is still governed by the delay of lockup release control and the automatic transmission is often brought unlocked after the vehicle engine has lowered down below the fuel injection recovery speed. Accordingly, due to a rapid development of engine power, the vehicle engine will be subjected to shocks resulting in an engine stall.

OBJECT OF THE INVENTION

It is, therefore, an object of the present invention to provide a vehicle engine controller for a vehicle engine associated with an automatic transmission which is brought into a lockup position when the vehicle is decelerated.

It is another object of the present invention to provide a vehicle engine control which can prevent the vehicle engine from stalling due to a delay of lockup control of an automatic transmission upon an engine deceleration.

It is still another object of the present invention to provide a vehicle engine controller which can make sufficient use of an available braking power of the vehicle engine.

SUMMARY OF THE INVENTION

A particular feature of the present invention resides in the cooperation of means for increasing the generating power of a vehicle engine equipped with automatic transmission lockup feature when an operating engine speed of the vehicle engine is lower than a lockup release speed. The lockup release speed is corrected according to deceleration rates of the vehicle engine.

According to the provision of the engine power increasing means, when the vehicle engine slows down in speed, deceleration operation means calculates a deceleration rate and a lockup release speed is set at a reference speed. The reference lockup release speed is corrected according to the deceleration rate. The automatic transmission is brought into a non-lockup position when the vehicle engine slows down to the corrected lockup release speed which becomes higher as the deceleration rate becomes larger. Because the automatic transmission is certainly brought into the non-lockup position when the vehicle engine operates at a speed higher than a fuel injection recovery speed, the vehicle engine is prevented not only from being subjected to shocks but from stalling. Although the automatic transmission may possibly be subjected to a delay of lockup release control when the vehicle engine is rapidly decelerated, the vehicle engine is forced to develop an increased power by means of the power increasing means, still being prevented from stalling.

Furthermore, since the lockup release speed is varied according to deceleration rates, when the vehicle engine is moderately decelerated, the automatic transmission lockup control is available within a whole range of deceleration of the vehicle engine, allowing to make sufficient use of the available braking power of the vehicle engine.

BRIEF DESCRIPTION OF THE DRAWINGS

The above and other objects and features of the present invention will become apparent from the following detailed description taken in conjunction with the preferred embodiments thereof with reference to the accompanying drawings in which like reference characters designate similar elements or parts throughout several views of the drawings and wherein:

FIG. 8 is a block diagram similar to FIG. 2 but of the engine controller of FIG. 7.

DETAILED DESCRIPTION OF PREFERRED EMBODIMENTS OF THE INVENTION

Figure 1:
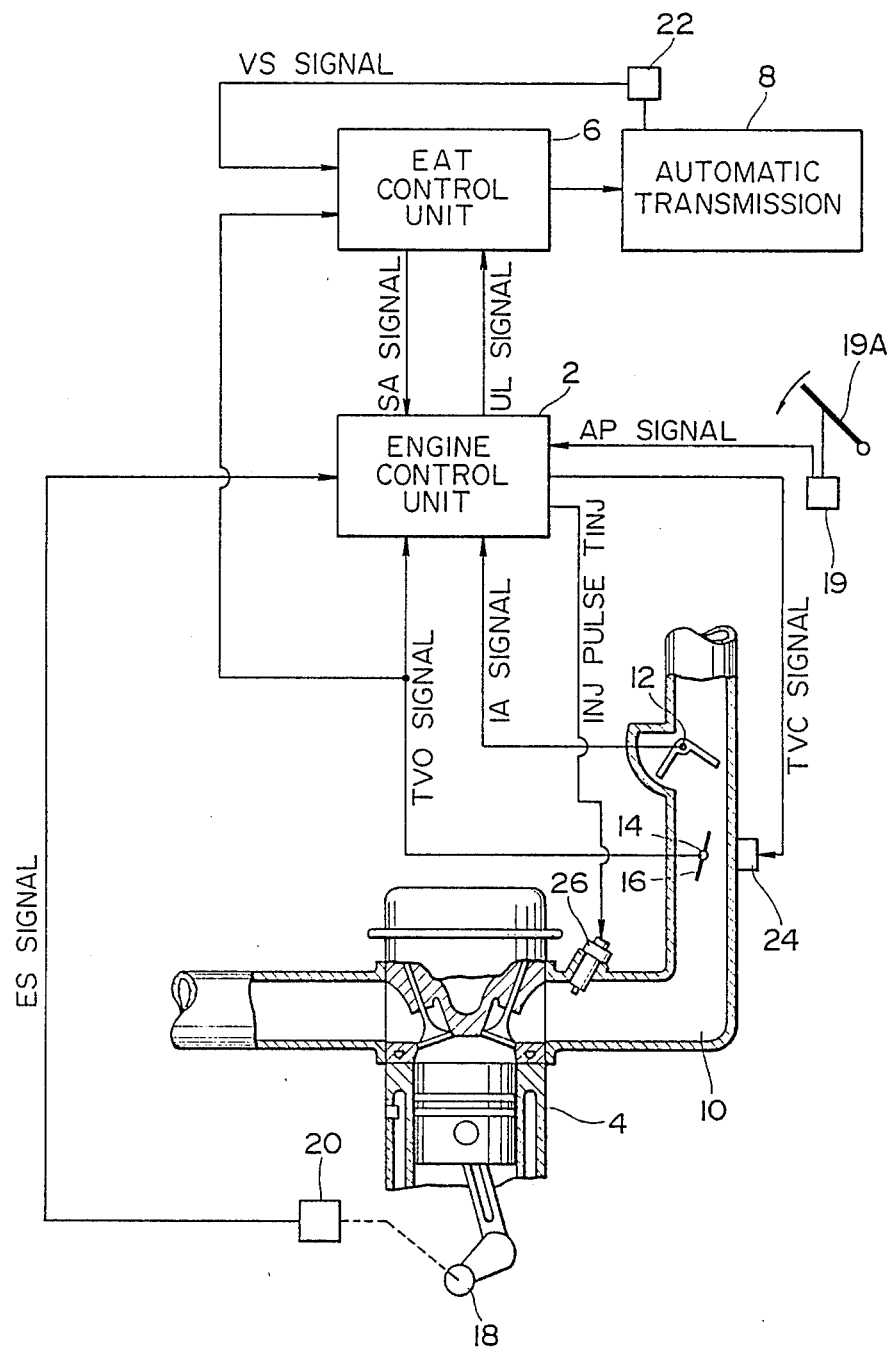
FIG. 1 is a schematic illustration of various elements of a vehicle engine of the type having a throttle actuator with its associated automatic transmission including an engine controller according to a preferred embodiment of the present invention.

Referring now to FIG. 1 showing in a block diagram, the engine control system for a vehicle engine with a throttle valve actuator in cooperation with an automatic transmission according to a preferred embodiment of the present invention, the engine control system includes an engine control unit 2 mainly comprising a microcomputer for controlling a vehicle engine 4 and is associated with a transmission control unit or EAT control unit 6 for controlling a four speed automatic transmission 8 with a lockup feature well known per se in the art.

In association with the vehicle engine 4, there are provided various sensors and meters. An air flow sensor 12 disposed in an air intake 10 of the vehicle engine 4 provides an appropriate signal (IA signal) according to the amount of air flow flowing in the air intake 10 and sends it to the engine control unit 2. A throttle valve sensor 14 associated with a throttle valve 16 disposed in the air intake 10 provides an appropriate signal TVO according to positions or openings of throttle valve 16 to both the engine control unit 2 and the EAT control unit 6. In cooperation with, for example, a crankshaft 18 of the vehicle engine 4, there is an engine speed sensor 20 which sends an appropriate signal ES indicating an operating engine speed N in rpm of the vehicle engine 4. Further, there are a vehicle speed sensor 22 provided in association with, for example, an output shaft of the automatic transmission 8 which sends an appropriate vehicle speed signal VS indicating a cruising speed of the vehicle and an accelerator position sensor 19 associated with an accelerator pedal 19A which provides an accelerator position signal AP according to operated positions of the accelerator pedal 19A. Operation and construction of each of these meter and sensors 12, 14, 19, 20 and 22 is well known to those skilled in the art, so that a more detailed description is unnecessary.

According to these signals from these meter and sensors, the engine control unit 2 controls various electrically controlled elements such as a stepping motor 24 in cooperation with the throttle valve 16, a pulse controlled fuel injector 26, lockup solenoids for shifting and locking up the automatic transmission 8, and an ignition system (not shown but well known in the art). As will be described in detail later with reference to FIG. 2, it is to be noted that the engine control unit 2 has a fuel cut off feature which is a control to suspend the injection of fuel until the engine speed N in rpm of the vehicle engine 4 becomes lower than a predetermined or preselected fuel injection recovery speed at which the fuel injector 26 resumes to inject fuel when the vehicle engine 4 is in a deceleration mode. It is also to be noted, as will be described in detail later with reference to FIG. 2, that, when the vehicle engine is being decelerated, the engine control unit 2 controls the automatic transmission 8 to maintain the automatic transmission in a lockup position through the EAT control unit 6 until the operating engine speed N in rpm becomes lower than a predetermined or preselected lockup release engine speed in rpm at which the automatic transmission is brought into a non lockup operation mode.

Figure 2:
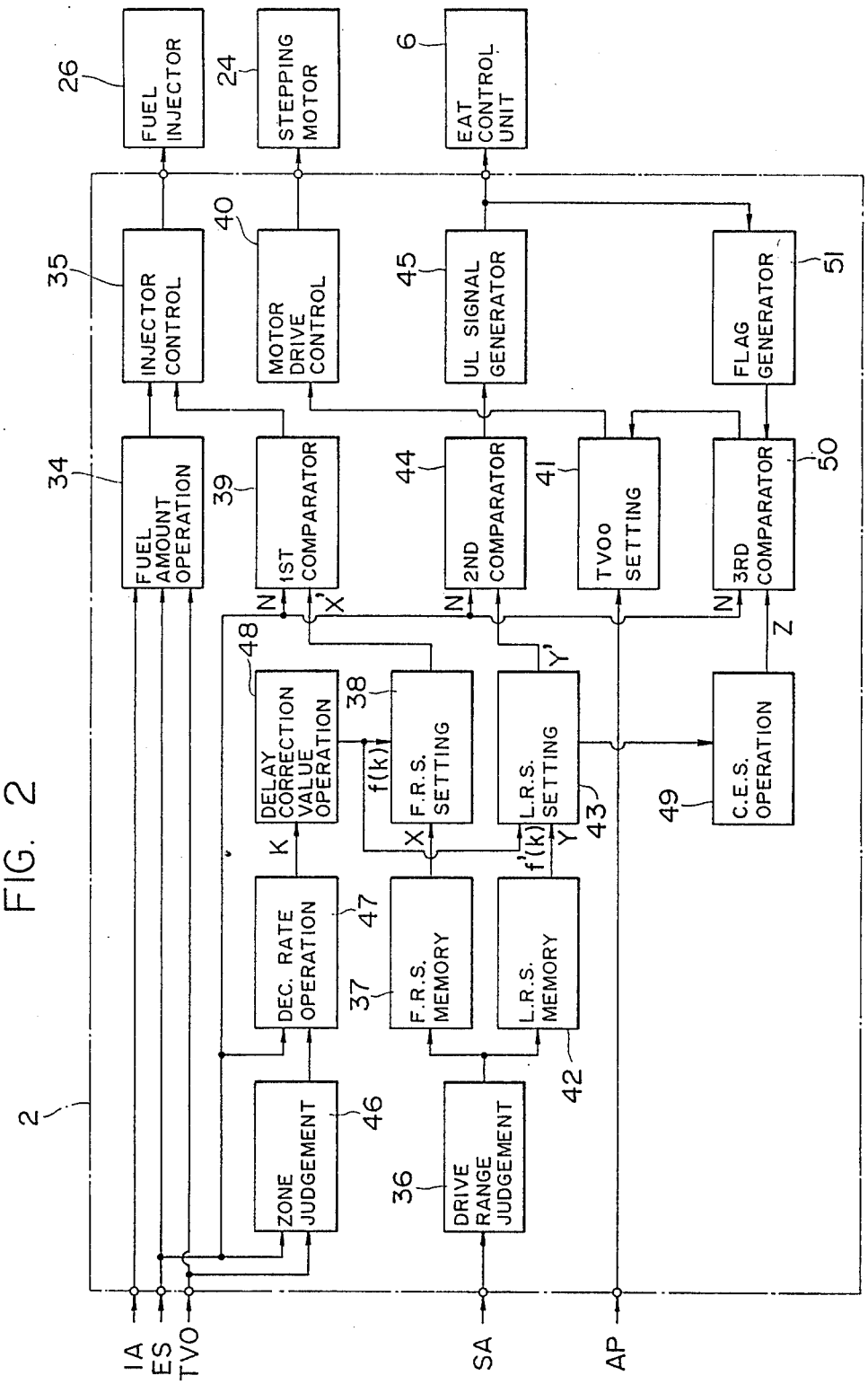
FIG. 2 is a block diagram showing a circuitry of the engine controller of FIG. 1.

To understand the operation of the engine control unit 2, reference is now had to FIG. 2 in conjunction with FIG. 1. As shown, in the engine control unit 2, there are fuel amount operation means 34 for calculating the amount of fuel to be injected through the fuel injector 26 based on those incoming signals IA, ES and TVO from the intake air flow meter 12, throttle valve sensor 14 and engine speed sensor 20, and injector control means 35 which provides the fuel injector 26 with an injector pulse $T_{INJ}$ whose width is adjusted so as to deliver the calculated amount of fuel in the fuel amount operation means 34 into a cylinder of the vehicle engine 4. As is well known, pulse width is a measurement of how long the fuel injector is kept open—the wider the pulse width, the longer the open time. If the fuel amount operation means 34 receives a throttle valve opening or position signal TVO representative of the throttle valve 16 in its idle position (throttle valve opening angle=0), it gives a signal which controls the injector means 34 to provide no injector pulse $T_{INJ}$ and to thereby cut the injection of fuel even while the vehicle engine 4 is operating. This action is, in this specification, referred to a fuel cut-off control. The engine control unit 2 includes means (not shown) for providing the EAT control unit 6 with a lockup signal for energizing lockup solenoids of the automatic transmission 8 to bring the automatic transmission 8 into the lockup operation mode when receiving a throttle valve opening or position signal TVO representative of the throttle valve 16 in its idle position while the vehicle engine 4 is operating.

For a recovery of the fuel injection cut-off control which is suspended when an injector pulse $T_{INJ}$ disappears and a release of transmission lockup control which is initiated by the presence of a lockup signal, the engine control unit 2 is structured as follows. In order to prevent the vehicle engine 4 from stalling due to a delay of lockup release control, it is needed to set different engine speeds one individual to each of several, for example four in this embodiment, drive ranges $D_1$ to $D_4$ of the automatic transmission 6 as reference fuel injection recovery speeds X in rpm (which is represented by a signal value $V_x$) and as reference lockup release speeds Y (which is represented by a signal value $V_y$). For setting these reference engine speeds X and Y, the engine control unit 2 includes drive range judging means 36 which judges an operating drive range of the automatic transmission 8 based on a solenoid actuating signal SA which is provided by the EAT control unit 6 for the purpose of actuating transmission shift solenoids of the automatic transmission 8 to shift the automatic transmission 8 into a desired drive range. This transmission shift operation may be effected in any well known manner. The solenoid actuating signal SA for the transmission shift solenoids is provided in the form of a three-bit binary code signal individually to each of the four drive ranges of the automatic transmission 8. In the engine control unit 2, there are a fuel injection recovery speed memory (F.R.S memory) 37 which memorizes the reference fuel injection recovery speed signal (F.R.S) $V_x$ representing the reference fuel injection recovery speed X in rpm for each of the four drive ranges; fuel injection recovery speed setting (F.R.S setting) means 38 for setting an actual fuel injection recovery speed X' in rpm in the form of a signal $V_{x'}$ which is obtained based on the reference fuel injection recovery speed X selected according to an operating drive range in which the vehicle engine is presently operating while the vehicle engine is decelerated and a delayed control correction value f(K) which will be described in detail later; and first comparator 39 for comparing the actual fuel injection recovery speed X' with an operating engine speed N in rpm indicated by the ES signal to determine whether the vehicle engine 4 is slowed down to an engine speed lower than the actual fuel injection recovery speed X'.

For a release of transmission lockup control which is, as was previously described, effected when the vehicle engine 4 is decelerated, there are provided in the engine control unit 2 a lockup release speed memory (L.R.S. memory) 42 for memorizing reference lockup release speeds Y in rpm in the form of reference lockup release speed signal (L.R.S) $V_y$ for the respective drive ranges at which the automatic transmission 8 is brought into the non-lockup position; lockup release speed setting (L.R.S. setting) means 46 for setting therein an actual lockup release speed Y' in rpm which is obtained based on the reference lockup release speed Y selected according to a drive range at which the automatic transmission 8 is presently operating in a normal or moderate deceleration condition of the vehicle engine 4 and a delayed control correction value f'(K) which will be described in detail later; second comparator 44 for comparing the actual engine speed Y' with the operating engine speed N to determine whether the vehicle engine 4 is decelerated slower than the actual lockup release speed Y'; and means 45 for providing the EAT control unit 6 with a release or unlock (UL) signal for actuating the lockup solenoids to bring the automatic transmission 8 into the non-lockup position upon the vehicle engine 4 is determined to have been decelerated slower than the actual lockup release speed Y'.

The engine control unit 2 for the automatic transmission 8 according to the present invention is so constructed as to prevent the vehicle engine 4 from stalling upon a rapid deceleration takes place. For the prevention of engine stalling, the engine control unit 2 is provided with means for increasingly correcting the reference fuel injection recovery speed and the reference lockup release speed so as to make them larger than a critical engine stalling speed at which the vehicle engine may possibly be led to an engine stall upon a rapid deceleration takes place. Such an engine stall is generally occurred due to the delay of lockup release control of the automatic transmission. Therefore, for compensating the delay of lockup release control, the reference fuel injection recovery speed X and the reference lockup release speed Y are somewhat increased or decreased and corrected or changed to the actual speeds X' and Y', respectively. For this change, the engine control unit 2 is provided with delay control compensation means for providing the delayed control correction value f(K) or f'(K) in order to increasingly or decreasingly correct the reference speeds X and Y according to deceleration rates.

Figure 3A:
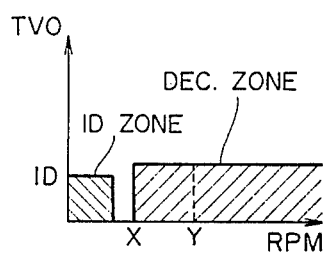
FIG. 3A is a graph showing engine operating zones.
Figure 3B:
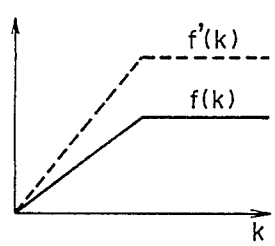
FIG. 3B is a graph showing curves of control correction value.

This delayed control compensation means includes zone judging means 46 for judging whether the vehicle engine operating condition is in a decelerating zone (shown in FIG. 3A as a DEC zone) based on an engine speed signal ES representing an engine speed N in rpm and a throttle valve opening signal TVO; deceleration rate (DEC. rate) operation means 47 which is enabled to calculate a deceleration ratio K of the vehicle engine 4 based on the engine speed N when the vehicle engine is judged to be in the DEC zone; and delay correction value operation means 48 for calculating a delay correction value which is represented by a function f(K) for the reference fuel injection recovery speed X or a function f'(K) for the reference lockup release speed Y shown by way of example in FIG. 3B.

The delay correction value operation means 48 functions as means for correcting the reference lockup release speed Y and the reference fuel injection recovery speed X. The fuel injection recovery speed setting means 38 is adapted to set the actual fuel injection recovery speed X' based on the reference fuel injection recovery speed X read out from the fuel injection recovery speed memory 37 set according to an operating drive range and the delay correction value f(K) fetched from the delay correction value operation means 48. The actual fuel injection recovery speed X' varies depending on the deceleration ratio K of engine speed and may be calculated by the use of either a formula X'=X+f(K) or a formula X'=X·f(K). The lockup release speed setting means 43 is adapted to set the actual lockup release speed Y' based on the reference lockup release speed Y read out from the reference lockup release speed memory 42 set according to the operating drive range and the delay correction value f'(K) fetched from the delay correction value operation means 48. The actual lockup release speed Y' varies depending on the deceleration ratio K of engine speed and may be calculated by the use of either a formula $Y'=Y+f'(K)$ or a formula $Y'=Y \cdot f'(K)$.

The deceleration rate operation means 47 is operationally sufficient to calculate a speed reduction N of the vehicle engine per unit time t, namely $K \Delta rpm/\Delta t$. For this calculation, the deceleration rate operation means 47 may be adapted to sample an engine speed N in rpm at an appropriate periodic time t and to divide the difference of speed in rpm between two engine speeds N consecutively sampled by the periodic time t, thereby obtaining the deceleration ratio K.

In the case that the vehicle engine 4 is rapidly decelerated at a reduction rate so high as to certainly be led to stalling if the injection of fuel actually takes place and the automatic transmission 8 is brought into the lockup position, namely in the case of the present operating engine speed N having already become lower than the actual lockup release speed Y', the engine control unit 2 forces the injector to inject fuel so as to develop the generating power of the vehicle engine, thereby to prevent the vehicle engine from suddenly stalling. For practically effecting this forced fuel injection, the engine control unit 2 is provided with critical engine stall (C.E.S.) speed operation means 49 for calculating a critical engine stall speed Z in rpm, at which the vehicle engine 2 possibly suddenly stalls, by the use of a formula: $Z=Y'-r$ (wherein r is usually fixed to be on the order of $10^1$ rpm), and providing a critical engine stall speed signal indicating the critical engine stall speed Z; and a third comparator 50 for comparing an operating engine speed N with the critical engine stall speed Z to provide a throttle opening correction value TM which is sent to target throttle valve opening ($TVO_0$) setting means 41. The target throttle opening setting means 41 receives the accelerator position signal AP indicating an intended throttle valve opening TVO and the throttle valve opening correction value TM so as to calculate a target throttle valve opening $TVO_0$ by the use of a formula: $TVO_0=TVO+TVO_{TM}$. A signal of the target throttle valve opening $TVO_0$ is sent to a stepping motor drive control 40 to actuate the stepping motor 24 so as to increasingly open the throttle valve 16, increasing the amount of airflow to develop the generating power of the vehicle engine 4, when the present operating engine speed N is lower than the critical engine stall speed Z while the automatic transmission 8 is in the lockup position.

In the engine control unit 2, there is a flag generator 51 adapted to provide a flag signal; "Flag=0" when the automatic transmission 8 is in the lockup position or "Flag=1" when the automatic transmission 8 is in the non-lockup position. The flag signal is transmitted to the third comparator 50 to judge whether the automatic transmission 8 is in the lockup or the non-lockup position. Generally speaking, in operation of the vehicle engine 2 controlled by the engine control unit 2, when an accelerator 19A is released and brought into its idle position to decelerate the vehicle engine 4, the engine control unit 2 controls the fuel injection system to cut off the injection of fuel until the operating engine speed N of the vehicle engine 4 is reduced lower than the reference fuel injection recovery speed set according to a drive range in which the automatic transmission 8 is operating. Specifically, when the throttle valve 16 is brought into its idle position by releasing the accelerator 19A, the fuel amount operation means 34 provides no signal, so that the injector control means 34 suspends the provision of injection pulse $T_{INJ}$, cutting off the injection of fuel by the fuel injector 26. At the same time, the automatic transmission 8 is brought into the lockup position and kept therein until the vehicle engine 4 slows down its speed N to a reference lockup release speed Y under the control of the engine control unit 2 and the EAT control unit 6. At the moment these fuel injection cut-off and transmission lockup control is initiated, a sequential control of operation of the engine control unit 2 is conducted to terminate the fuel injection cut-off and transmission lockup control.

Figure 5:
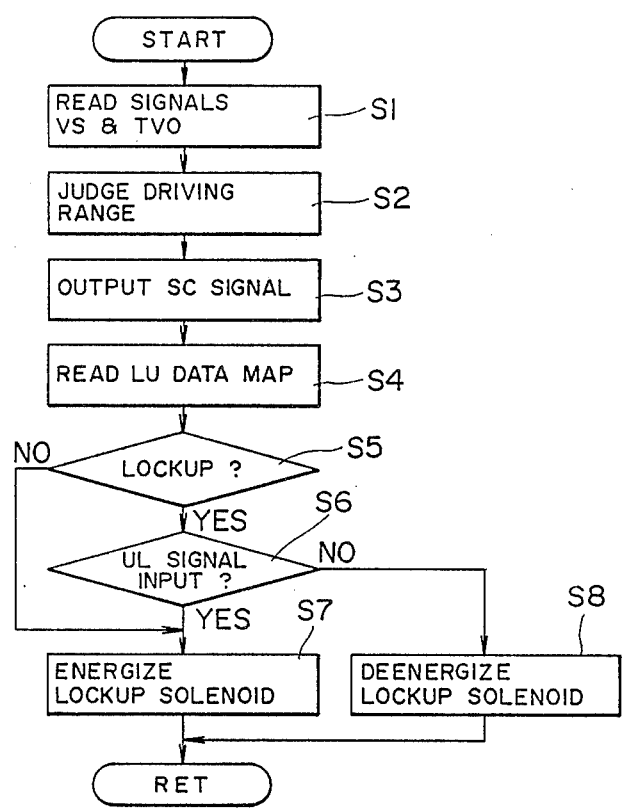
FIG. 5 is a flow chart illustrating a control routine for a microcomputer which controls operation of the automatic transmission.
Figure 4:
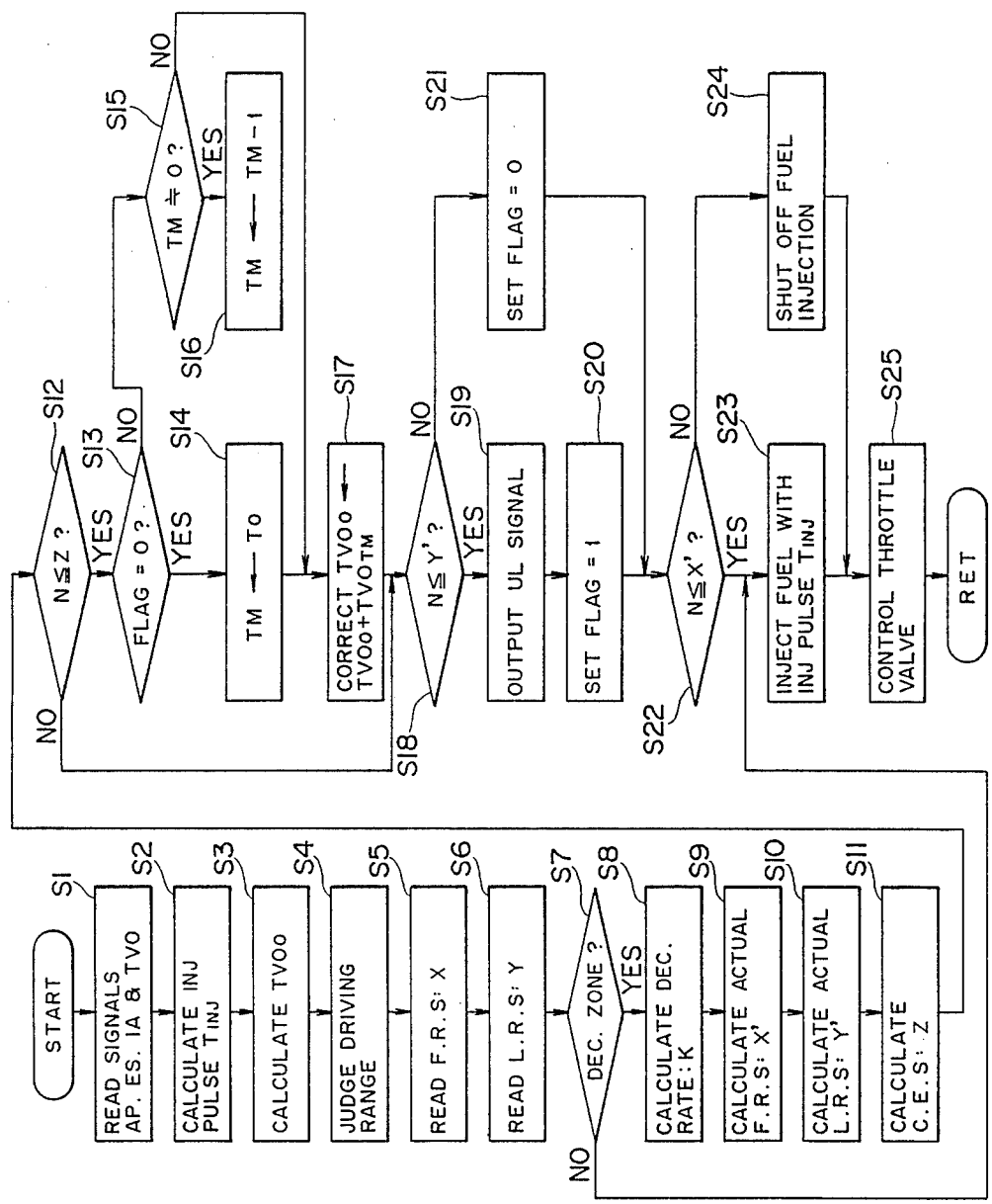
FIG. 4 is a flow chart illustrating a control routine for a microcomputer which controls operation of the vehicle engine of FIG. 1.

The operation of the control apparatus shown in FIGS. 1 and 2 is best understood by reviewing FIGS. 4 and 5, which are flow charts illustrating routines for microcomputers by which the engine control unit and the EAT control unit are constructed, in conjunction with FIGS. 3(A), (B) and 6. Programming a microcomputer is a skill well understood in the art. The following description is written to enable a programmer having ordinary skill in the art to prepare an appropriate program for the microcomputer. The particular details of any such program would of course depend upon the architecture of the particular computer selection.

As shown in FIG. 4, at the beginning of the sequential control of fuel injection recovery and lockup release operation, the engine control unit 2 reads necessary signals, namely the engine speed signal ES, throttle valve opening signal TVO, intake air signal IA and accelerator opening; or position signal AP in step S1. Then, an injector pulse $T_{INJ}$ having an appropriate pulse width is calculated based on the intake air signal IA and operating engine speed signal ES in step S2 and a target throttle opening $TVO_0$ is set based on the accelerator opening signal AP in step S3. The injector pulse width is a measurement of how long the fuel injector 26 is kept open. The amount of fuel delivered by the fuel injector 26 depends upon the pulse width. According to the solenoid actuating signal SA in the form of a three-bit binary signal, the zone judging means 46 judges the operating zone of the automatic transmission 8 in step S4. Data on a reference fuel injection recovery speed X and a reference lockup release speed Y are read according to the judged operating zone in steps S5 and S6, respectively. Thereafter, a decision is made in step S7 based on the operating engine speed N and throttle opening TVO read in step S1: "is the vehicle engine 4 in the deceleration operating zone (DEC. zone) ?" If the answer to the decision in step S7 is yes, a deceleration rate K is calculated in the operating means 47 in step 8. After the calculation of the deceleration rate K, the actual fuel injection recovery engine speed X' and the actual lockup release engine speed Y' are calculated in steps S9 and S10, respectively. In step S11, the critical engine stall speed Z is calculated and the signal of the calculated critical engine stall speed Z is sent to the third comparator 50.

After those fundamental values are calculated or set, a decision is made in the third comparator 50 in step S12: "is the present operating engine speed N as low as or lower than the critical engine stall speed Z?" If the answer to the second decision is yes, a third decision is made in step S13: "has the Flag=0 been set?" If the "Flag=0" has been set, this indicates that the automatic transmission 8 has been in the lockup position. Therefore, in order to prevent the vehicle engine 4 from stalling, the throttle valve opening correction value TM is set to a predetermined certain value $T_0$ and the target throttle valve opening $TVO_0$ is set as the actual throttle opening TVO added by the correction value $TVO_{TM}$ in step S17. On the other hand, if the "Flag=1" has been set and a throttle valve opening correction value TM is not zero, the throttle valve correction value TM is decremented by one (1) and set to a value of TM−1. Otherwise, no correction value is set.

If the operating engine speed N is higher than the critical engine stall speed Z, steps S13 to S17 are skipped. After either the setting of the target throttle opening $TVO_0$ or the decision in step S12, a decision is made in step S18: "is the present engine speed N as low as or lower than the actual lockup release engine speed Y'?" If the answer to the decision is yes, a lockup release signal UL is provided. Under the provision of the lockup release signal UL, the EAT control unit 6 energizes the lockup solenoids to bring the automatic transmission 8 into non-lockup position in step S19 and the flag signal generator 51 provides the "Flag=1" in step S20. In the case of the operating engine speed N is higher than the actual lockup release engine speed Y' then the "Flag=0" is set in step S21. After the setting either the "Flag=1" or the "Flag=0", a final decision is made in step S22: "is the operating engine speed N in rpm as low as or lower than the actual fuel injection recovery speed X'?" If the answer is yes, then the injector control means 35 provides an injector pulse $T_{INJ}$ for causing the injector 26 to inject fuel in step S23. Otherwise, namely if the answer to the final decision is no, the injector control means 35 provides no injector pulse, cutting off the injection of fuel of the injector 26 in step S24. In the final step S25, the motor drive control means 40 controls the stepping motor 24 to turn, causing the throttle valve 16 to open to the target throttle valve opening $TVO_0$.

If the answer to the decision in step S7 is no, this indicates that the vehicle engine 4 is not in the deceleration zone. In this case, the engine control unit 2 skips steps S8 through S22 and continues the injection of fuel with the injector pulse $T_{INJ}$.

Figure 6:
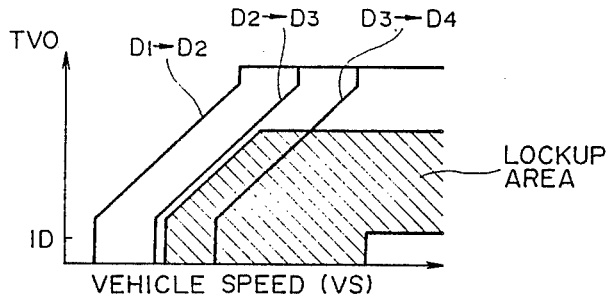
FIG. 6 data map showing drive range and lockup area.

While the engine control unit 2 operates, the EAT control unit 6 operates according to a routine shown in FIG. 5. As shown, the first step S1 is to read the outputs, namely TVO signal and VS signal, from the throttle valve sensor 14 and the vehicle speed sensor 22. According to the throttle valve opening signal TVO and operating vehicle speed signal VS, in step S2, a drive range in which the automatic transmission 8 is to operate is determined with reference to a shift pattern data map exemplarily shown in FIG. 6. Consequently, the EAT control unit 6 provides a solenoid actuating signal SC in the form of a three-bit binary code to actuate appropriate shift solenoids in step S3, so as to thereby shift the automatic transmission 8 into the determined drive range. This solenoid actuating signal SA is transmitted also to the engine control unit 2. Then, in step S4, a lockup data map such as exemplarily shown in FIG. 6 is read in to determine whether the automatic transmission 8 is to be locked up or not to be. This determination is actually made in step S5 according to the data read in step S4. If the answer to the decision in step S5 is yes, this indicates that the vehicle speed and the throttle opening values fall in a lockup area of the lockup data map. Then, a second decision is made in step S6: "is there a lockup release signal UL provided by the lockup release (UL) signal generator 45 in step S20 in FIG. 4. If in fact a lockup release signal UL is provided, namely the answer to the second decision is yes, the EAT control unit 6 deenergizes lockup solenoids of the automatic transmission 8 to thereby bring the automatic transmission 8 into non-lockup position. Otherwise, if there is no lockup release signal UL, the EAT control 6 unit energizes the lockup solenoids to lockup the automatic transmission 8.

In step S5, if the answer to the decision is no, then the EAT control unit 6 deenergizes the lockup solenoid to keep the automatic transmission 8 in the non-lockup position regardless the presence or absence of a lockup release signal UL.

Figure 7:
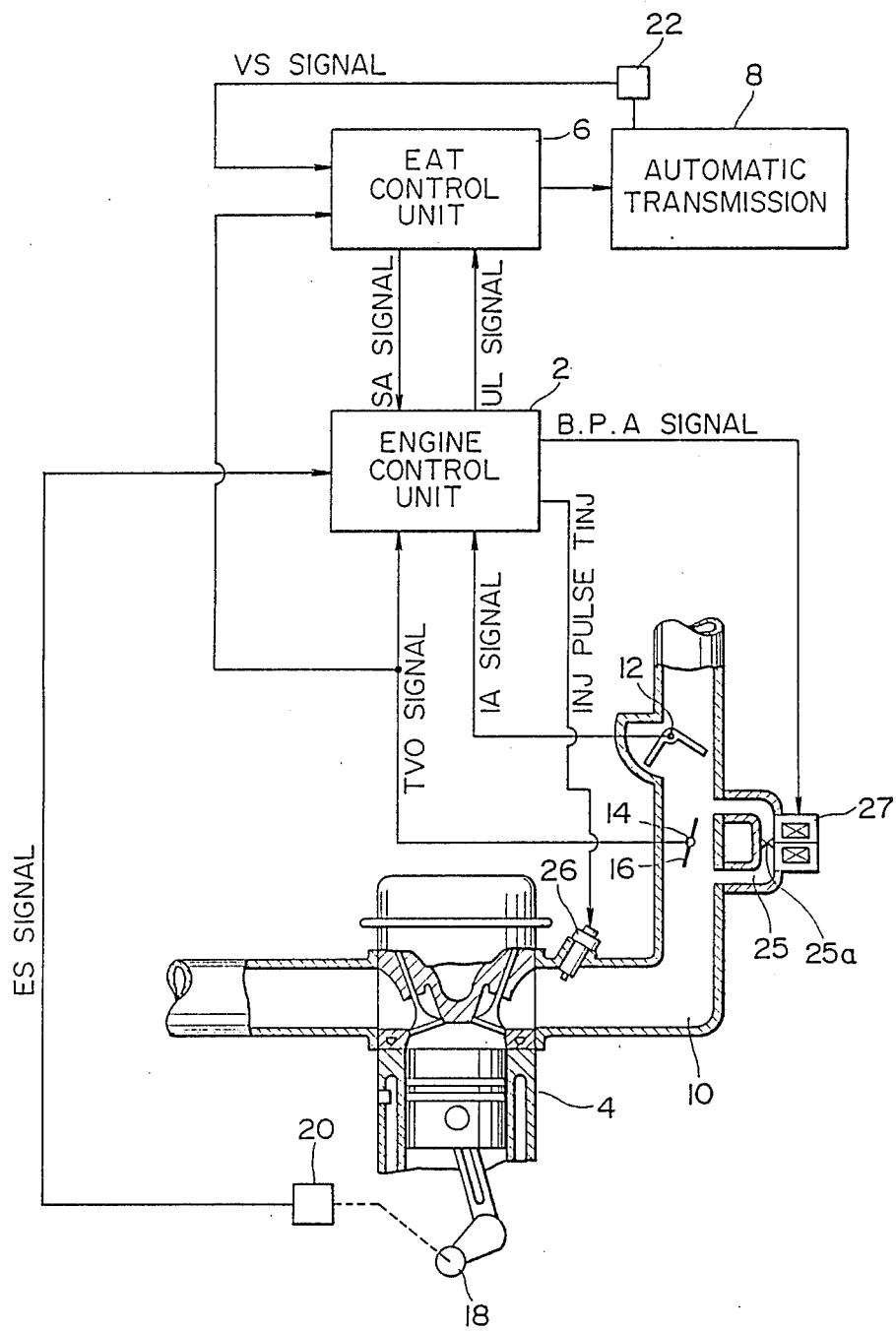
FIG. 7 is a schematic illustration similar to FIG. 1 but showing a vehicle engine of the type having an idle speed controller.

FIG. 7 shows another preferred embodiment of the present invention which is applied to a vehicle engine with an actuator of the type having idle speed control. As is well known in the art, an idle speed control is effected by varying an amount of airflow bypassing a throttle valve. As is, shown in FIG. 7, the air intake 10 is provided with an air bypass 25 to allow air to flow bypassing the throttle valve 16 during idle. In the air bypass 25, there is provided an idle speed control valve 25A which is controlled to open and close by means of actuator solenoids 27 actuated by the application of bypass air control signal (B.P.A signal) provided from the engine control unit 2 so as to vary the amount of airflow passing through the air bypass 25, thereby to vary the idle speed of the vehicle engine.

In the engine control unit 2 for the vehicle engine 4 shown in FIG. 8, there is provided, in place of the target throttle valve opening ($TVO_0$) setting means 41 in the engine control unit for the vehicle engine of the type having a throttle actuator shown in FIG. 2, an idle speed control system for performing the idle speed control. This idle speed control system comprises zone judging means 60 for judging whether the vehicle opening is operating in the idle zone shown in FIG. 3A based on the operating engine speed N input in the form of an engine speed signal ES and throttle valve opening signal TVO, basic bypass air operation means 61 for calculating a basic bypass air amount $Q_{ISC}$, target speed data memory 62 in which memorized are various control speeds for various throttle valve openings TVO, and bypass air operation circuit 63 for operating a corrected bypass air amount.

For effecting the calculation of basic bypass air amount $Q_{ISC}$, the operation means 61 reads out a control speed from the target speed data memory 62 according to the throttle valve opening TVO and compares it with the operating engine speed N to determine the speed difference therebetween. According to the obtained difference, the basic bypass air operation means 61 provides a basic bypass air amount $Q_{ISC}$ with which the actuator solenoids 27 are basically controlled through solenoid control means 64. However, if it is judged in the third comparator 50 that the operating engine speed N has become as low as or lower than the critical engine stall speed Z and that the "Flag=0" has been set, the bypass air operation circuit 63 increasingly corrects the basic bypass air amount $Q_{ISC}$ by adding a correction air amount $Q_{ISC-TM}$ thereto, so as to provide an actual bypass air amount $Q_{ISC-0}$ in order to avoid an occurrence of engine stall. Then, the actuator solenoids 27 are controlled with the actual bypass air amount $Q_{ISC-0}$ through the solenoid control means 64.

Figure 9A:
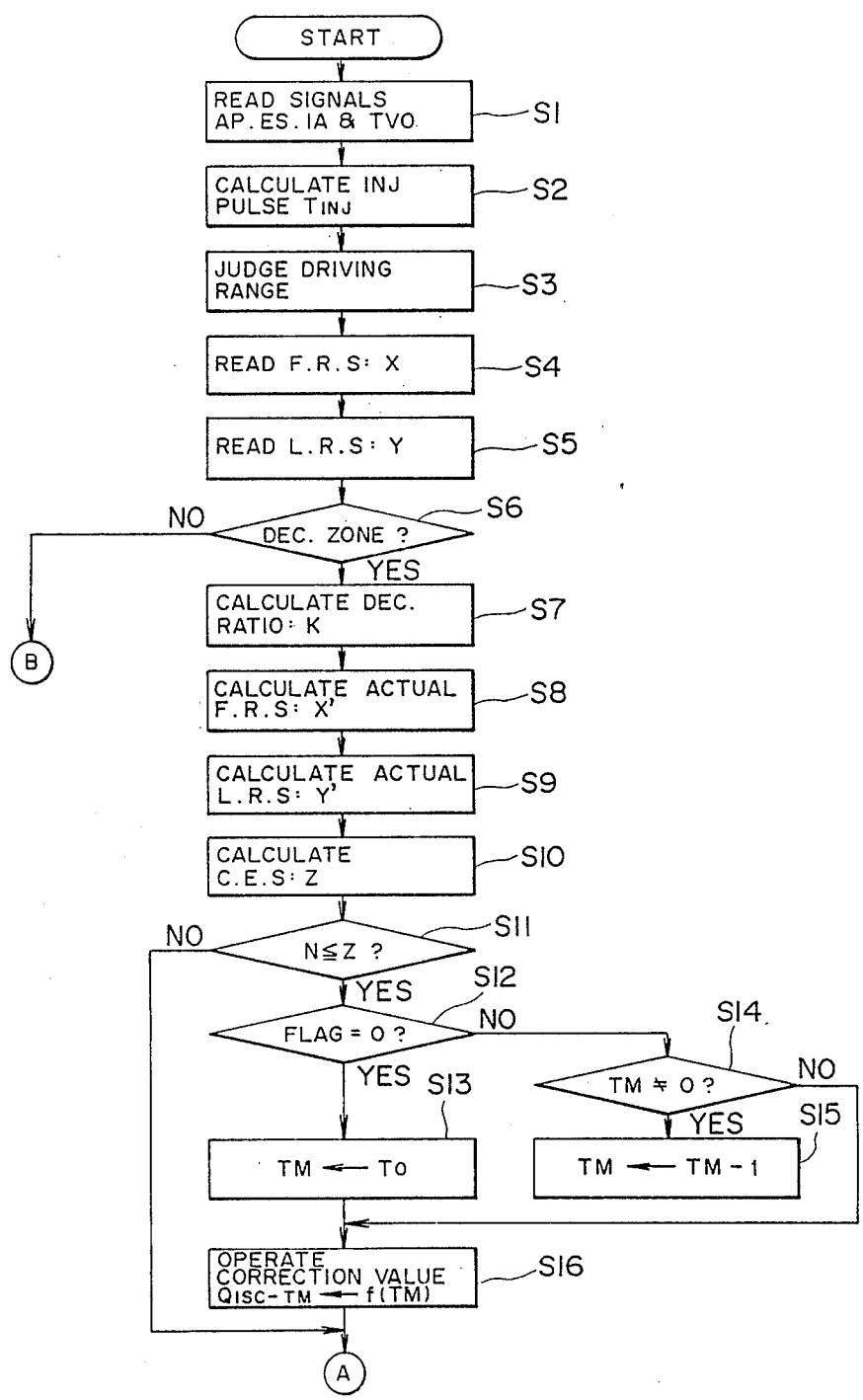
FIGS. 9A and 9B flow charts illustrating a control routine for a microcomputer which controls operation of the vehicle engine of FIG. 7.
Figure 9B:
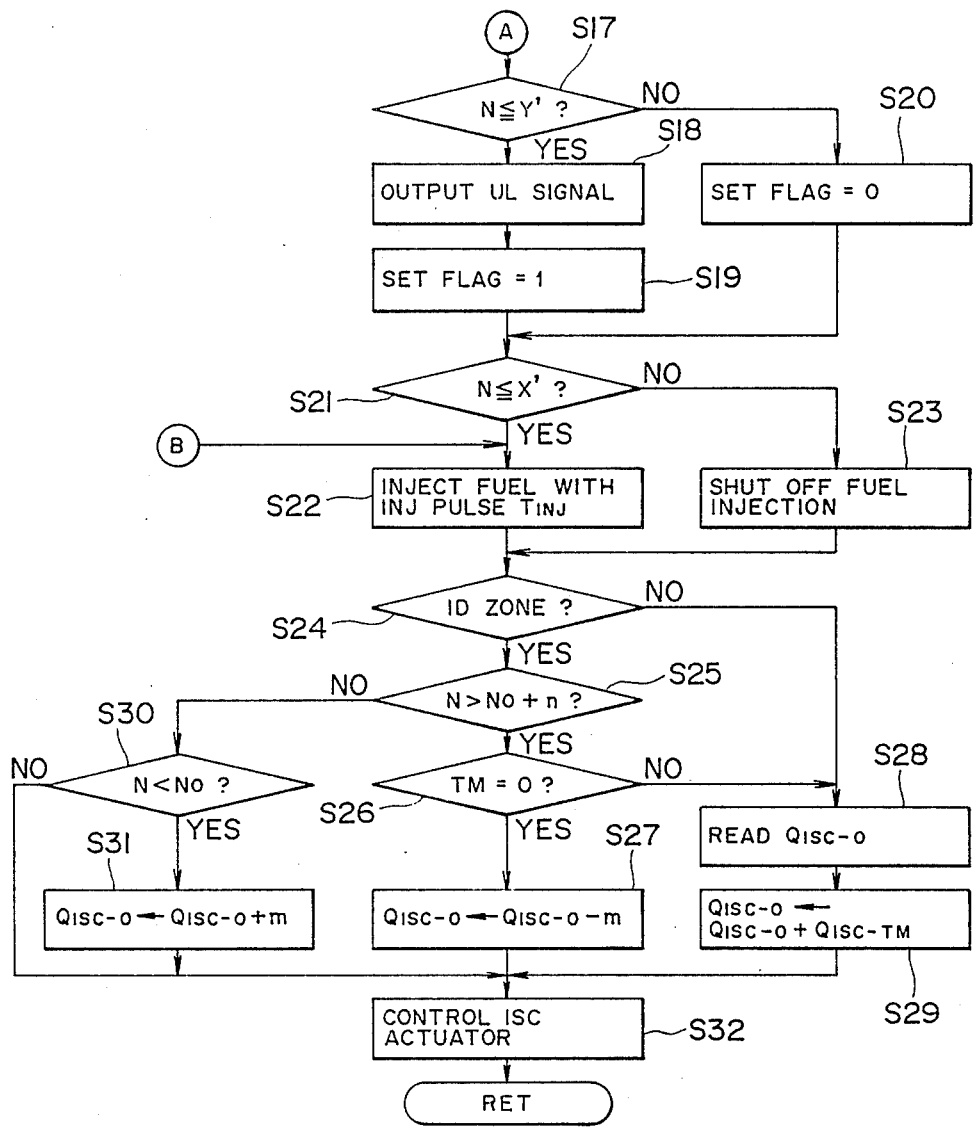

FIGS. 9A and 9B are flow charts illustrating a routine for a microcomputer by which the engine control unit 2 is constructed. The first step in FIG. 9(A) is to read necessary signals, namely the operating engine speed ES, throttle valve opening signal TVO and intake air signal IA. Then, injector pulse $T_{INJ}$ having an appropriate pulse width is calculated based on the intake air signal IA and operating engine speed signal ES in step S2. According to the solenoid actuating signal SA in the form of a three-bit binary signal applied from the EAT control unit 6, the zone judging means 46 judges the operating drive zone of the automatic transmission 8 in step S3. Data on a reference fuel injection recovery speed X and a reference lockup release speed Y are read out from the fuel recovery speed (F.R.S) memory 37 and the lockup release speed, (L.R.S) memory 42 according to the judged drive range in step S4 and S5, respectively.

Thereafter, in step S6, a decision is made in the zone judging means 46 based on the operating engine speed N represented by the ES signal and throttle valve opening TVO read in step S1: "is the operating engine speed of the vehicle engine 4 in the deceleration zone ?" If the answer to the decision in step S6 is yes, a deceleration rate K is calculated in the operation means 47 in step S7. After the calculation of deceleration rate K, an actual fuel injection recovery speed X' and an actual lockup release speed Y' are calculated in steps S8 and S9, respectively. In step S10, a critical engine stall speed Z is calculated and a signal of the calculated critical engine stall speed Z is sent to the third comparing means 50.

After those fundamental values are calculated or set, a second decision is made in the third comparing means 50 in step S11: "is the operating engine speed N as low as or lower than the critical engine stall speed Z?" If the answer to the first decision is yes, then a third decision is made in step S12: has the Flag=0 been set?" Depending upon the answer to the third decision, an airflow control correction value TM is changed in three ways. If the answer is yes, which indicates that the automatic transmission has been locked up, then, in order to prevent the vehicle engine 4 from stalling, the control correction value TM is set to the predetermined value TM0 in step S13. On the other hand, if the answer to the third decision in step S12 is no and the control correction value TM is judged not to be zero in step S14, the control correction value TM is decremented by one (1) in step S15. Otherwise, namely when the control correction value TM is zero, no change is made. According to the control correction value TM thus changed, an bypass air correction amount $Q_{ISC-TM}$ required to correctively control the idle speed of the vehicle engine is given as a function f(TM). If the operating engine speed N is higher than the critical engine stall speed Z, the steps S12 to S16 are skipped.

As is shown in FIG. 9B, either after the setting of the bypass air correction amount $Q_{ISC-TM}$ or when the answer to the decision in step S11 is no, a decision is made in step S17: "is the operating engine speed N as low as or lower than the actual lockup release speed?" If the answer to the decision is yes, then, a lockup release signal UL is provided by the UL signal generator 45 in step S18. Under the provision of lockup release signal UL, while the EAT control unit 6 unlocks the automatic transmission 8, the flag signal generator 51 sets the Flag=1 in step 19. In the case of the operating engine speed N is higher than actual lockup release speed Y', then the Flag=0 is set. After the setting either the Flag=1 or the Flag=0, the operating engine speed N is compared with the actual fuel injection recovery speed X'. If the operating engine speed N is not higher than the actual fuel injection recovery speed X', then the control means 35 provides an injector pulse $T_{INK}$ for causing the injector 26 to inject fuel in step S22. Otherwise, namely if the operating engine speed N is higher than the actual fuel injection recovery speed X', the injector-control means 35 provides no injector pulse so as to shut off the injection of fuel in step S23.

While the injector 26 either injects fuel or not, the ID zone judging means 60 judges based on the engine speed and throttle valve opening signals ES and TVO whether the operating condition of the vehicle engine 4 is in the idle zone (shown in FIG. 3A). If the vehicle engine 4 is judged to be operating in the idle zone, a decision is made in step S25: "is the operating engine speed N higher than the target idle engine speed $N_0$ added by a certain value of speed n. If the operating engine speed N is higher, another decision is made in step S26: "is the control correction value TM zero?" If the control correction value TM is zero, the basic bypass air amount $Q_{ISC-0}$ is decreased by a certain amount m as an actual bypass air amount. If the control correction value TM is not zero, then the basic bypass air amount $Q_{ISC-0}$ is read out from the basic air amount operation means 61 in step S28 and corrected by adding the bypass air correction amount $Q_{ISC-TM}$ in the bypass air operation circuit 63 in step S29.

In the event that the operating engine speed N is not higher than the target idle engine speed $N_0$ added by the certain value n of speed, then, the operating engine speed N is determined to be lower than the target idle engine speed $N_0$ or not. If the operating engine speed N is lower than the target idle engine speed $N_0$, the basic bypass air amount $Q_{ISC-0}$ is increased by the certain amount m as an actual bypass air amount $Q_{ISC-0}$ in step S31. In the event that the operating engine speed is as high as or higher than the target idle engine speed $N_0$, the basic bypass air amount $Q_{ISC-0}$ is not corrected. In the final step S32, the solenoid control means 64 controls the bypass air control solenoids 27 to open the bypass air control valve 25A to allow the amount $Q_{ISC-0}$ of bypass air to flow through the bypath 25.

The automatic transmission 8 associated with the engine control unit 2 shown in FIG. 8 is also controlled by the EAT control unit 6 in the same way as described in association with FIG. 5.

Although the present invention has been fully described by way of preferred embodiments thereof with reference to the accompanying drawings, it is to be noted that various changes and modifications will be apparent to those skilled in the art. Therefore, unless otherwise such changes and modifications depart from the scope of the present invention as defined by the appended claims, they should be construed as included therein.

What is claimed is:

1. A control apparatus for a vehicle equipped with an automatic transmission having a lockup unit which is disposed between an output shaft of a vehicle engine and an input shaft of the automatic transmission and is activated at a speed larger than a lockup release speed at which said lockup unit is brought into a non-lockup position and which is set when the vehicle engine is decelerated, said control apparatus comprising:

means for detecting an operating engine speed of said vehicle engine;

means for calculating a deceleration rate of said operating vehicle engine;

means for setting said lockup release speed based on said deceleration rate in such a way that said lockup release speed becomes higher as said deceleration rate increases;

means for cutting off injection of fuel sprayed into a cylinder of said vehicle engine when said vehicle engine is decelerated;

means for resuming said injection of fuel when said operating engine speed reaches a fuel injection recovery speed which is set lower than said lockup release speed; and means for increasingly correcting said lockup release speed according to said deceleration rate in such a way that the difference between said lockup release and fuel injection recovery speeds becomes larger as said deceleration rate increases.

2. A control apparatus for a vehicle equipped with an automatic transmission having a lockup unit which is disposed between an output shaft of a vehicle engine and an input shaft of the automatic transmission and is activated at a speed larger than a lockup release speed at which said lockup unit is brought into a non-lockup position and which is set when the vehicle engine is decelerated, said control apparatus comprising:

means for detecting an operating engine speed of said vehicle engine;

means for calculating a deceleration rate of said operating vehicle engine;

means for setting said lockup release speed based on said deceleration rate in such a way that said lockup release speed becomes higher as said deceleration rate increases, means for cutting off injection of fuel sprayed into a cylinder of said vehicle engine when said vehicle engine is decelerated;

means for resuming said injection of fuel when said operating engine speed reaches a fuel injection recovery speed which is set lower than said lockup release speed;

means for increasingly correcting said lockup release speed according to said deceleration rate in such a way that the difference between said lockup release and fuel injection recovery speeds becomes larger as said deceleration rate increases; and means for increasingly correcting an amount of fuel injected upon said recovery of fuel injection in such a way that said corrected amount of fuel is made larger as said deceleration rate becomes larger while said automatic transmission is in said lockup position.

3. A control apparatus defined in claim 2, further comprising:

operating drive range detecting means for detecting an operating drive range of said automatic transmission; and fuel injection recovery speed correcting means for increasingly correcting said fuel injection recovery speed to become higher as said operating drive range detecting means detects a higher operating drive range.

4. A control apparatus as defined in claim 2, further comprising:

operating range detecting means for detecting an operating drive range of said automatic transmission; and lockup release speed correction means for increasingly correcting said lockup release speed to become higher as said operating drive range detecting means detects a higher operating drive range.

* * * * *